Feb. 11, 1941.    J. N. PAGE    2,231,223
PIE BAKING PAN
Filed July 3, 1939    2 Sheets-Sheet 1
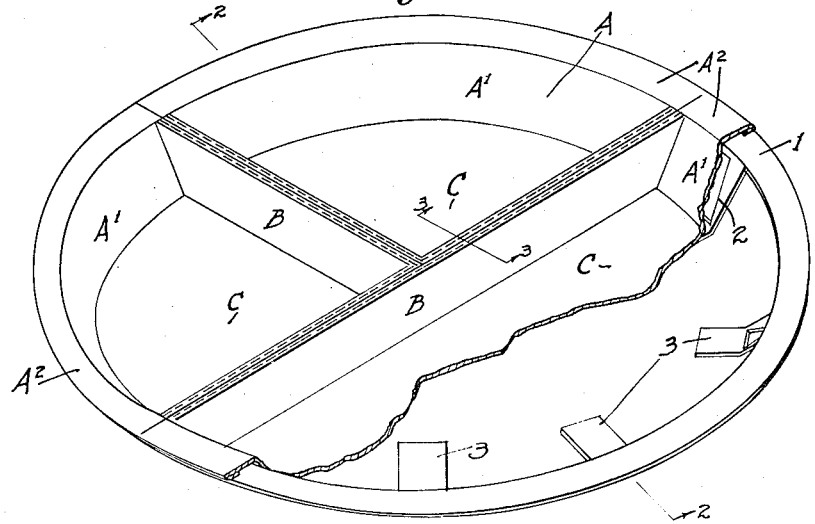
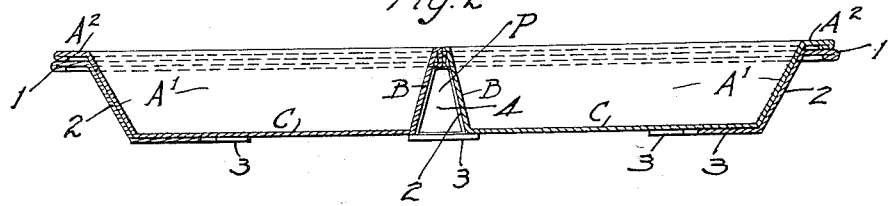
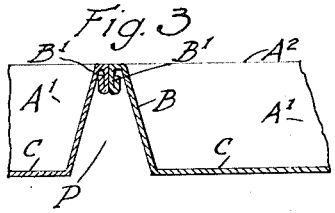 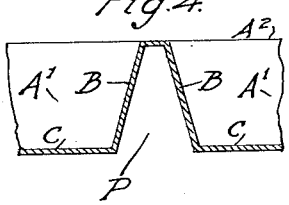
INVENTOR
John N. Page.
BY
His Attorney INVENTOR
John N. Page.
His Attorney Patented Feb. 11, 1941

2,231,223

UNITED STATES PATENT OFFICE 2,231,223

PIE BAKING PAN

John N. Page, South St. Paul, Minn.

Application July 3, 1939, Serial No. 282,704

3 Claims. (Cl. 53—6)

My invention refers to pie baking pans and associated devices to be used in the baking and subsequent handling of pies and the like and principally relates to improvements in cooking and is especially designed for the baking of pies, although adaptable for use for other foods or effects.

The object is to provide a cooking or baking receptacle of a character permitting individual pie servings each of specific different ingredients.

An additional object is to provide a baking utensil provided with divisional means that assist all around baking i. e. to bake on all sides by heat.

A further object is to provide a receptacle for the baker wherein he can dispose of his ware with either two or three separate varieties of pie per pan to the smaller restaurants.

A further object is to provide a divided receptacle that may readily be cleaned and stacked one above the other for rapid feeding into an automatic pie filling machine.

A further object of the invention is to provide a sustaining ring for either the divided individual pan or the collective groups of several pans, said ring providing means for sustaining the several pans or pan and providing baking ducts between the several divisions for all around baking, and after baking, all around cooling.

A further object is to provide a means whereby the restauranteur receives a greater variety of pies of small volume so as to suffer no turn backs due to unsold ware. He is enabled to buy either two separate pies of three cuts each or three separate pies of two cuts each in one unit or may be produced in a single pan in place of the usual six of one kind now within a pie. Thus the restaurants are provided with a greater variety of fresh pies at a lesser expense.

The principle of the invention lies in the provision of the pan or individual pans cooperating with a baking pan retention ring which ring will sustain either a divided pan or a series of pans.

The other objects and advantages in the invention reside in certain novel features of construction, combination and arrangement of parts which will be hereinafter more fully described and particularly pointed out in these specifications and their appended claims reference being had to the accompanying drawings forming part of the specification and in which:

Figure 1 is a perspective view of my invention showing the application and relation of the component parts to each other illustrating one-half pan and two-quarter pans within the sustaining baking ring.

Figure 2 is a cross section taken on the line 2—2 of Figure 1.

Figure 3 is an enlarged cross sectional view at the junctional edge of the pans on the line 3—3 of Figure 1.

Figure 4 is an alternate view for Figure 3 of the central division as applied to a single pan best illustrated in Figure 7.

Figure 5:
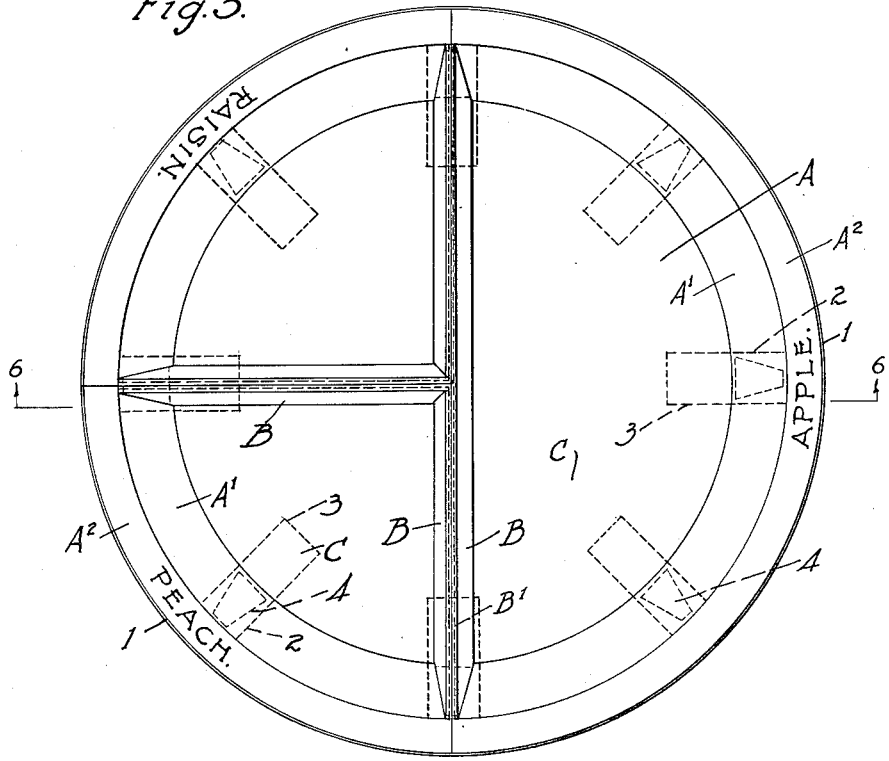
Figure 5 is a plan view of my invention showing the entire assembly ready for use for the several different ingredients.
Figure 6:
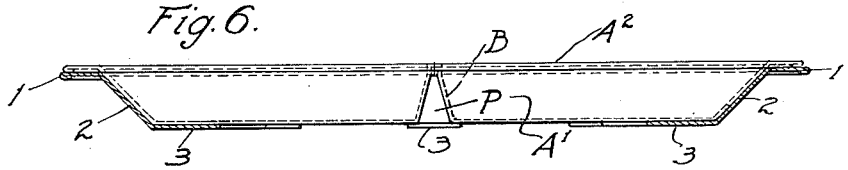
Figure 6 is a cross sectional view of the sustaining ring taken on the line 6—6 of Figure 5 showing two half pans within the ring.
Figure 7:
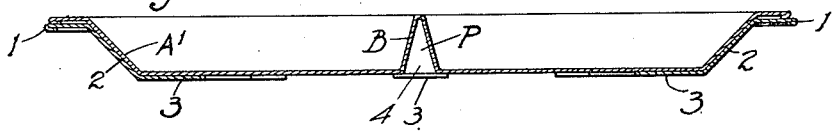
Figure 7 is a similar cross section typifying a divided single pan.

In referring to the drawings A represents the pie tin or tins in which the central divisional walls B are the inner walls of either one-half, one-third, or one-quarter tins. Said tins A are provided with exterior inclined pie walls A1 and with the usual pie crimping edge projection A2. The pie tin bottoms C are of usual flat construction with the walls A1 inclined and the walls B likewise inclined to a lesser degree than the exterior inclined pie wall A1.

The walls B of the separate units are provided with reinforced edge ribs B1 so as to create a pocket P for the circulation of heated air, affording a better baking along the walls B.

According to the present invention, the pan or pans and their component baking ring may be formed of two or more parts. One of the said parts, hereinafter designated as the bake ring 1 is of angular shape, comprising an annular ring 1 provided with a series of legs at an angle equal to the incline of the sustained pan or pans. The said legs 2 are provided with inwardly extending feet members 3 to give support and to sustain the pans so as to provide a complete circulation of air beneath the pan or pans within the ring, likewise permitting heat to travel upward and sidewise within and from the several heat ducts P formed by the pie walls B separating the several pies.

The legs 2 are further provided with perforations equal to the end of the duct area at its termination. The walls B are integral with the floor C and a continuation of the several pie walls A1 but of a lesser angulation. The function of the several pie walls B because of the flat top with the return lip B1 forming the central division is an afforded means for a crimping divisional edge to the several pies similar to the crimping edge A2 about the peripheral pan edge.

With this arrangement as indicated on the drawings hereto, a person may bake a one-half apple pie and a one-quarter of peach pie and a quarter of raisin pie or by using different associated pans may bake one-third apple, one-third peach or a third of raisin or any variation thereof. The baker is thus provided with a means to serve the smaller restaurant with any of the desired smaller pies affording full pie cuts and thus enabling the restauranteur a greater variety of pies at a lesser cost.

In use, either the single divided pan or several individual one-half, one-fourth, or one-third size pans are assembled within the ring and fed through the pie making machine, in its usual manner each of the several divisions so filled with the proper ingredients and provided with a pie coverage for baking. The sustaining ring retains the pan or several pans in an elevated position and collectively forming a pie circle. The elevation of the pie tin or tins from the oven floor permits a free circulation of heated air to travel along the bottom of the pans allowing perfect baking of that part of the pie which heretofore has been mostly soggy.

The inclined sides of the inner walls B permit the heat to rise similar to the exterior walls A1 and are offered escapement through the duct ends or the openings 4 within the ring legs 3 which may block the ends of the heat ducts. To overcome any possible trapping of heated air within the heat ducts by the legs registering with the ducts in assembling, the legs are thus provided with heat escapement orifices or openings 4 to permit free escapement of airs from the ducts registering with the same.

I claim:

1. A cooking utensil of the character described, comprising a plurality of individual pie pans, each pan having inclined outer wall and extended outer lip, and having inclined inner wall whereby contacting pans will form an intermediate inverted V shaped heating channel, and an inclosing ring member comprising an outer inclined wall fitted to the outer walls of the pans and terminating in inwardly extending feet partly contacting with the bottoms of the inclosed pans, for the purpose set forth.

2. A cooking utensil of the character described, comprising a plurality of individual pie pans, each pan having inclined outer wall and extended outer lip, and having inclined inner wall whereby contacting pans will form an intermediate inverted V shaped heating channel, and an inclosing ring member comprising an outer inclined wall fitted to the outer walls of the pans and terminating in inwardly extending feet partly projecting under the bottoms of the inclosed pans, and openings in the inclined wall of said ring member to align with the heating passages between said pans, for the purpose set forth.

3. A cooking utensil of the character described, comprising a plurality of individual pans, each pan having inclined outer wall and having inclined inner wall whereby to form inverted V shaped heating channels between contacting pans, downturned outer lips on the upper edges of said inclined inner walls to form a separating closure at the upper ends of said channels, and an inclosing ring member comprising an outer inclined wall fitted to the outer walls of the pans and terminating in inwardly extending feet extending partly underneath the bottoms of inclosed pans, for the purpose set forth.

JOHN N. PAGE.